(12) United States Patent
Jeol

(10) Patent No.: US 9,150,691 B2
(45) Date of Patent: Oct. 6, 2015

(54) POLYAMIDE, PROCESS FOR PREPARING SAME AND USES THEREOF

(75) Inventor: Stéphane Jeol, Cumming, GA (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 14/131,448

(22) PCT Filed: Jul. 5, 2012

(86) PCT No.: PCT/EP2012/063092
§ 371 (c)(1),
(2), (4) Date: Jan. 20, 2014

(87) PCT Pub. No.: WO2013/007585
PCT Pub. Date: Jan. 17, 2013

(65) Prior Publication Data
US 2014/0135449 A1    May 15, 2014

(30) Foreign Application Priority Data
Jul. 8, 2011   (FR) .................................... 11 56223

(51) Int. Cl.
*C08G 69/26* (2006.01)
*C08G 63/44* (2006.01)
*C08G 69/40* (2006.01)

(52) U.S. Cl.
CPC .............. *C08G 69/26* (2013.01); *C08G 69/265* (2013.01); *C08G 69/40* (2013.01)

(58) Field of Classification Search
None
See application file for complete search history.

(56) References Cited

U.S. PATENT DOCUMENTS

2009/0018300 A1* 1/2009 Bloom et al. .................. 527/102
2011/0052649 A1* 3/2011 Loyen et al. .................. 424/401

OTHER PUBLICATIONS

NPL, US Department of Energy, Werpy et al. Biomass, Top Value Added Chemicals from Biomass, p. 1-76.*

Claude Moreau et al: "Recent Catalytic Advances in the Chemistry of Substituted Furans from Carbohydrates and in the Ensuing Polymers", Topics in Catalysis, Kluwer Academic Publishers—Plenum Publishers, NE, vol. 27, No. 1-4, Feb. 1, 2004, pp. 11-30, XP019292015.
Fehrenbacher et al.: "Synthese and Charakterisirerung von Polyestern une Polyamidees auf der Basis von Furan-2, 5dicarbonsa re", Chemie Ingenieur Technik, vol. 81, No. 11, 2009, pp. 1829-1835, XP002671544.
Mitiakoudis A. et al.—Synthesis and Characterization of Furanic Polyamides; Macromolecules 1991, vol. 24, pp. 830-835 (6 pages).

* cited by examiner

Primary Examiner — Susannah Chung
Assistant Examiner — Robert T Butcher

(57) ABSTRACT

The present invention relates to a novel polyamide synthesized from biosourced monomers. The novel polyamide comprises the repeating unit of formula I below:

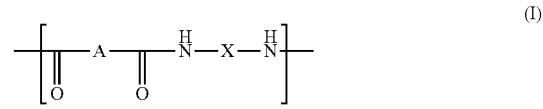

in which
A represents a covalent bond or a divalent hydrocarbon-based group chosen from saturated or unsaturated aliphatics, saturated or unsaturated cycloaliphatics, aromatics comprising at least 5 carbon atoms, arylaliphatics and alkylaromatics;
X represents a divalent group of formula II or III below:

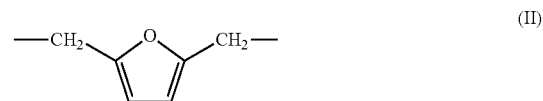

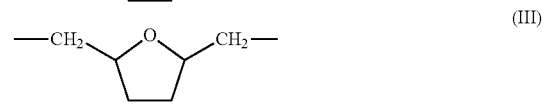

The present invention also relates to the process for preparing the said polyamide, to its uses, and to articles and compositions comprising the said polyamide.

17 Claims, No Drawings

POLYAMIDE, PROCESS FOR PREPARING SAME AND USES THEREOF

This application is a U.S. national phase entry under 35 U.S.C. §371 of International Application No. PCT/EP2012/063092, filed on Jul. 5, 2012, which claims priority to French Application No. 11 56223, filed on Jul. 8, 2011, the entirety of which is being incorporated herein by reference for all purposes.

The present invention relates to a novel polyamide, to a process for preparing it and to its uses. The invention more particularly relates to a polyamide synthesized from biosourced monomers.

The term "biosourced" means that it is a material derived from renewable resources. A renewable resource is a natural, animal or plant resource, whose stock can be reconstituted over a short period on a human timescale. It is in particular necessary for this stock to be able to be renewed as quickly as it is consumed.

Unlike materials derived from fossil materials, renewable starting materials contain a large proportion of $^{14}C$. This characteristic may especially be determined via one of the methods described in standard ASTM D6866, especially according to the mass spectrometry method or the liquid scintillation spectrometry method.

These renewable resources are generally produced from cultivated or non-cultivated vegetable matter such as trees, plants such as sugarcane, corn, cassava, wheat, rapeseed, sunflower, palm, castor-oil plant or the like, or from animal matter such as fats (tallow, etc.).

Polymers synthesized from biosourced monomers are of major interest nowadays since they make it possible to reduce the environmental footprint. There are a large number of combinations of biosourced monomers or of combinations of monomers that are biosourced and derived from fossil resources, which may be used to generate polymers that are then termed biosourced. Some of these biosourced polymers may be used to replace polymers derived from fossil resources. This is the case, for example, for polyamide PA 6.10, synthesized from hexamethylenediamine (fossil resource) and from biosourced sebacic acid derived from castor oil, which can replace PA 12 (derived from fossil resources) especially in motor vehicle applications.

Among the biosourced monomers, there is great interest in 2,5-furandicarboxylic acid, obtained, for example, from hydroxymethylfurfural (HMF), which is itself obtained, for example, from sugars, such as glucose.

2,5-Furandicarboxylic acid is especially used in direct replacement for terephthalic acid, derived from fossil resources, and in combination with diols such as ethylene glycol, 1,3-propanediol or 1,4-butanediol, to synthesize semi-crystalline polyesters that have excellent properties, whether for wrapping or textile applications. Thus, polyethylene furanoate (PEF) may be used instead of polyethylene terephthalate (PET) for the production of bottles.

Industrially, polyesters of the PET type are mainly synthesized via a direct esterification route between terephthalic acid and diols.

However, modifications of these industrial units prove to be necessary in order to synthesize high-quality PEFs, since, in the course of this reaction, the 2,5-furandicarboxylic acid degrades into furan, which is a toxic, carcinogenic and flammable molecule.

It is therefore more judicious to perform the synthesis of PEFs according to another industrial route for the manufacture of PETs from dimethylterephthalates. When applied to PEFs, this "diester" route is the reaction between dimethyl 2,5-furanoate and an excess of diol, the excess diol being removed by distillation under vacuum to make the polyester chains grow.

Semi-crystalline polyamides such as PA 66, PA 6, PA 11, PA 12 and PA 46 or polyphthalamides PA 6T/66, PA 6T/MT and PA 6T/6I, PA 10T and PA 9T are technical polymers that are widely used in applications such as motor vehicles, textiles or in the electrical and electronics (E&E) sector. They constitute the vast majority of the polyamides sold worldwide. Amorphous polyamides are, for their part, more marginal since the amorphous nature often limits the application performances and the working temperature range.

Polyamides have also been synthesized from 2,5-furandicarboxylic acid especially for the purpose of replacing terephthalic acid with a biosourced monomer. In contrast with polyesters derived from 2,5-furandicarboxylic acid, it appears, from a recent study by Ulrich Fehrenbacher published in Chemie Ingenieur Technik (Polymere) 2009, 81, 11, 1829-1835, that the polyamides made from the methyl diester derivative of 2,5-furandicarboxylic acid and from biosourced commercial diamines (e.g. 1,10-diaminodecane) or derived from fossil resources (e.g. hexamethylenediamine or 1,12-diaminododecane) are amorphous.

This characteristic represents a curb on the development of polyamides from 2,5-furandicarboxylic acid, since they cannot replace the semi-crystalline polyamides derived from fossil resources.

Furthermore, as for polyesters, the use of 2,5-furandicarboxylic acid for polyamide manufacture should be avoided since it generates furan, which is toxic.

Another curb on the development of these polyamides is the recourse to a "diester aminolysis" process, i.e. a process that consists in reacting a diamine with a diester. Specifically, such a process has two major drawbacks, in contrast with the case of the polyesters synthesized via the "diester" route. The first drawback is the appearance of side reactions that have an impact on the thermal properties (for example the crystallization) of the polyamides. The second drawback is that it is necessary to work with a stoichiometric amount of diamine and of diester in order to obtain polyamides of high molar masses. However, it is difficult to control this stoichiometric amount of diamine and of diester from an industrial point of view.

There is thus still a need to propose novel polyamides, which are preferably semi-crystalline, derived from biosourced molecules, which can replace the polyamides derived from fossil resources.

Furthermore, there is also a need to find a synthetic route for these biosourced polyamides that is simple, clean and reproducible and that advantageously uses the industrial equipment already in place for standard polyamides such as polyamide 66. Furthermore, the manufacturing process for synthesizing these polyamides should advantageously make it possible to achieve high molar masses.

In this context, it has been discovered, entirely surprisingly, that certain diamines containing a furan and/or tetrahydrofuran ring make it possible, especially in combination with dicarboxylic acids or derivatives, to synthesize novel polyamides that have particularly advantageous properties in the usual applications of polyamides. These diamines, which are advantageously biosourced, may be obtained especially from biosourced 2,5-furandicarboxylic acid.

One subject of the invention is thus a novel polyamide comprising the repeating unit of formula I below:

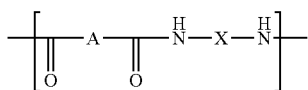

in which

A represents a covalent bond or a divalent hydrocarbon-based group chosen from saturated or unsaturated aliphatics, saturated or unsaturated cycloaliphatics, aromatics comprising at least 5 carbon atoms, arylaliphatics and alkylaromatics;

X represents a divalent group of formula II or III below:

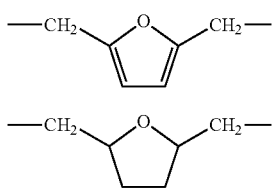

A subject of the invention is also a process for preparing the polyamide of the invention, which comprises a polycondensation reaction between:

at least one dicarboxylic acid or at least one carboxylic acid diester or at least one dinitrile of respective formulae IV, IV' and IV" below:

HOOC-A-COOH         (IV);

ROOC-A-COOR         (IV'), with R being a C1-C4 alkyl;

NC-A-CN             (IV")

with A as defined above;
at least one diamine of formula V below:

H$_2$N—X—NH$_2$         (V)

with X as defined above.

Furthermore, a subject of the invention is the use of the polyamide of the invention for preparing articles by moulding, injection moulding, injection/blow-moulding, extrusion/blow-moulding, extrusion or spinning. The present invention is thus also directed towards articles obtained from the polyamide according to the invention, the said articles being able to take the form of moulded or extruded pieces, yarns, fibres, filaments or films.

The articles thus obtained have applications in numerous fields such as technical plastics (motor vehicle, E&E, consumer goods, etc.), industrial yarns, the textile industry, packaging, etc.

The present invention also relates to compositions comprising at least the polyamide of the invention and optionally reinforcing fillers and/or various additives.

The novel polyamide according to the invention comprises a repeating unit of formula I as described above in which A represents a covalent bond or a divalent hydrocarbon-based group chosen from saturated or unsaturated aliphatics, saturated or unsaturated cycloaliphatics, aromatics, arylaliphatics and alkylaromatics. According to the invention, when A is a divalent aromatic hydrocarbon-based group, it comprises at least 5 carbon atoms in its aromatic ring, which may be interrupted with a heteroatom such as a nitrogen atom.

The term "saturated aliphatic group" means, for example, linear or branched alkyl groups containing from 1 to 36 carbon atoms. Preferably, a linear alkyl group containing from 4 to 10 carbon atoms will be chosen.

The term "unsaturated aliphatic group" means, for example, that the invention does not exclude the presence of an unsaturation on the aliphatic hydrocarbon-based chain, such as one or more double bonds that may or may not be conjugated, or alternatively a triple bond.

The hydrocarbon-based chain of the above aliphatic groups may optionally be interrupted with a heteroatom (for example oxygen, nitrogen, phosphorus or sulphur) or a functional group (for example carbonyl) or may bear one or more substituents (for example hydroxyl or sulphone) provided that they do not interfere under the reaction conditions or with regard to the intended application.

As preferred examples for the aliphatic groups A, mention may be made of the following groups: —(CH$_2$)$_4$—, —(CH$_2$)$_8$— and —(CH$_2$)$_{10}$—.

In formula (I), A may also represent a carbocyclic (or cycloaliphatic) group, which is preferably monocyclic. The number of carbon atoms in the ring may range from 5 to 8 carbon atoms, but it is preferably equal to 5 or 6 carbon atoms. The carbocycle may be saturated or may comprise 1 or 2 unsaturations in the ring, preferably 1 to 2 double bonds.

A s preferred examples of carbocyclic and monocyclic groups for A, mention may be made of the 1,4-cyclohexyl group, preferably the trans stereoisomer.

In other advantageous embodiments of the invention, A may also represent an aromatic divalent hydrocarbon-based group comprising at least 5 carbon atoms in its aromatic ring, which may be interrupted with a heteroatom such as a nitrogen atom. Preferably, the divalent aromatic hydrocarbon-based group comprises from 6 to 18 carbon atoms, such as a 1,4-benzene or 2,6-naphthalene group. It may also be a divalent arylaliphatic hydrocarbon-based group such as the group —(CH$_2$)$_n$—Ph—(CH$_2$)$_{n'}$— with n and n' being integers advantageously between 1 and 4, or a divalent alkylaromatic hydrocarbon-based group such as 1,3-benzene-5-tert-butyl. As preferred examples for the aromatic groups A, a 1,4-benzene group will be chosen.

According to one particular embodiment of the invention, A is a divalent hydrocarbon-based group that is biosourced in the sense of the present invention (standard ASTM D6866).

The novel polyamide according to the invention comprises a repeating unit of formula I as described above in which X represents a divalent group of formula II or III below:

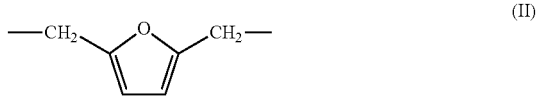

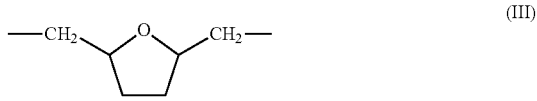

According to one particularly advantageous mode of the invention, X represents a divalent group of formula II.

In the particular embodiment according to which X is a divalent group of formula III, it may be the cis or trans stereoisomer or a mixture thereof. Preferably, the trans stereoisomer will be chosen. For the cis stereoisomer, the chiral carbons in positions 2 and 5 may be R,S or S,R or a meso mixture. For the trans stereoisomer, the chiral carbons in positions 2 and 5 may be S,S or R,R or the racemic mixture.

In a particularly advantageous manner, X is biosourced in the sense of the present invention (standard ASTM D6866).

According to one preferred embodiment of the invention, the polyamide of the invention has a true number-average molar mass Mn of between 500 and 50 000 g/mol, preferably between 2000 and 30 000 g/mol and even more preferentially between 5000 and 25 000 g/mol.

The true number-average molar masses are determined by various known methods such as gel permeation chromatography. The term "true number-average molar masses" should be understood as meaning that they are not measurements as polystyrene equivalents.

According to one advantageous embodiment, the polyamide according to the invention predominantly comprises the repeating unit of formula I. This repeating unit of formula I is advantageously derived from the polycondensation reaction between a dicarboxylic acid monomer of formula IV: HOOC-A-COOH (IV) with A as defined above and a diamine monomer of formula V: $H_2N$—X—$NH_2$ (V) with X as defined above. As explained previously, the dicarboxylic acid may also be substituted with a corresponding methyl, ethyl, propyl or butyl diester (formula IV') or alternatively with a corresponding dintrile (formula IV''').

The term "predominantly" means that the polyamide may be a homopolyamide consisting entirely of the repeating unit of formula I, but also that it may be a copolymer comprising other repeating units different from the unit of formula I, these repeating units possibly being derived from comonomers such as other dicarboxylic acids, other diamines, amino acids and/or lactams. These comonomers may represent up to 50 mol %, preferably up to 30 mol % and even more preferentially up to 15 mol % of the total amount of monomers introduced for the preparation of the polyamide of the invention.

The dicarboxylic acid monomers of formula IV are advantageously chosen from: oxalic acid, adipic acid, azelaic acid, sebacic acid, dodecanedioic acid, terephthalic acid, 2,6-naphthalenedicarboxylic acid and 1,4-cyclohexanedicarboxylic acid, preferably the trans stereoisomer.

These monomers are commercially available and may be biosourced. These monomers are particularly advantageous since they can give the polyamides of the invention a semi-crystalline nature.

The diamine monomers of formula V are advantageously chosen from: 2,5-bis(aminomethyl)furan and 2,5-bis(aminomethyl)tetrahydrofuran. In the particular embodiment according to which the diamine monomer of formula V is 2,5-bis(aminomethyl)tetrahydrofuran, it may be the cis or trans stereoisomer or a mixture thereof. Preferably, the trans stereoisomer will be chosen. For the cis stereoisomer, the chiral carbons in positions 2 and 5 may be R,S or S,R or a meso mixture. For the trans stereoisomer, the chiral carbons in positions 2 and 5 may be S,S or R,R or the racemic mixture.

These advantageously biosourced diamines may be synthesized, for example for 2,5-bis(aminomethyl)furan, by nitrilation of 2,5-furandicarboxylic acid followed by a selective hydrogenation, and a hydrogenation of the furan ring of 2,5-bis(aminomethyl)furan to prepare 2,5-bis(aminomethyl)tetrahydrofuran.

As dicarboxylic acid comonomers that may be used according to the invention, they may be, for example, oxalic acid, glutaric acid, adipic acid, suberic acid, azelaic acid, sebacic acid, 1,12-dodecanedioic acid; 1,3- or 1,4-cyclohexane-dicarboxylic acid; 1,3- or 1,4-phenylenediacetic acid; 1,3- or 1,4-cyclohexanediacetic acid; isophthalic acid; 5-hydroxyisophthalic acid; terephthalic acid; 4,4'-benzophenone dicarboxylic acid; 2,6-naphthalenedicarboxylic acid; and 5-t-butylisophthalic acid, alkali metal salts (Li, Na or K) of sulpho-5-isophthalic acid, and the C36 fatty acid dimers known under the name Pripol.

These comonomers are commercially available and may be biosourced.

The diamine comonomers may be chosen, for example, from hexamethylenediamine; 1,4-diaminobutane; 1,5-diaminopentane; 2-methyl-1,5-diaminopentane; 2-methylhexamethylenediamine; 3-methylhexamethylenediamine; 2,5-dimethylhexamethylenediamine; 2,2-dimethylpentamethylenediamine; heptanediamine; nonanediamine; 5-methylnonanediamine; 1,10-diaminodecane; dodecamethylenediamine; 2,2,4- and 2,4,4-trimethylhexamethylenediamine; 2,2,7,7-tetramethyloctamethylenediamine; meta-xylylenediamine; para-xylylenediamine; isophoronediamine; diaminodicyclohexylmethane and the C2-C16 aliphatic diamines that may be substituted with one or more alkyl groups, the C36 diamines known under the name Priamine.

These comonomers are commercially available and may be biosourced.

The lactam or amino acid comonomers may be chosen, for example, from caprolactam, 6-aminohexanoic acid; 5-aminopentanoic acid, 7-aminoheptanoic acid, 11-aminoundecanoic acid and dodecanolactam.

These comonomers are commercially available and may be biosourced.

Several processes for manufacturing the polyamide according to the invention may be envisaged, as described previously. These processes may be continuous or batch processes.

A first process proposed by the present invention is a process for preparing the polyamide according to the invention, which comprises a polycondensation reaction between:
at least one dicarboxylic acid of formula IV below:

HOOC-A-COOH           (IV)

with A as defined above;
at least one diamine of formula V below:

$H_2N$—X—$NH_2$           (V)

with X as defined above.

According to one preferred embodiment of the invention, at least one diamine of formula V is biosourced according to standard ASTM D6866.

According to one preferred embodiment of the invention, at least one dicarboxylic acid of formula IV is biosourced according to standard ASTM D6866.

This first process is similar in its conditions to the standard process for preparing polyamide of the type obtained from dicarboxylic acids and diamines, in particular the process for manufacturing polyamide 66 from adipic acid and hexamethylenediamine or the process for manufacturing the polyamide MXD6 by direct amidation starting with molten adipic acid and meta-xylylenediamine. These processes for manufacturing polyamide 66 and MXD6 are known to those skilled in the art. The process for manufacturing polyamide of the type obtained from dicarboxylic acids and diamines generally uses as starting material a salt obtained by mixing in stoichiometric amount generally in a solvent such as water of a diacid with a diamine. Thus, in the manufacture of poly(hexamethyleneadipamide), adipic acid is mixed with hexamethylenediamine generally in water to obtain hexamethylenediammonium adipate, which is more commonly known as Nylon salt or "N Salt".

Thus, in the manufacture of the polyamide according to the invention, the dicarboxylic acid of formula IV is mixed with the diamine of formula V, generally in water to obtain a salt of the two monomers. As explained above, these monomers may comprise up to 50 mol %, preferably up to 30 mol % and even more preferentially up to 15 mol % of other comonomers as described previously.

The salt solution is optionally concentrated by partial or total evaporation of the water. The formation of a dry salt between 2,5-bis(aminomethyl)furan and a diacid of formula IV advantageously avoids the degradation of the diamine.

The polyamide is obtained by heating at high temperature and pressure of an aqueous solution of the monomers (for example a salt solution as described above), or of a liquid comprising the monomers, to evaporate the water and/or the liquid while at the same time avoiding the formation of a solid phase.

The polymerization medium may also comprise additives such as antifoams, chain limiters (monofunctional molecules capable of reacting with the acid and/or amine functions), branching agents (i.e. molecules bearing at least three functional groups chosen from carboxylic acid and amine groups), catalysts, stabilizers (with respect to UV, heat or light), matting agents (for instance $TiO_2$, etc.), lubricants or pigments.

The polycondensation reaction is generally performed at a pressure of about 0.5-3.5 MPa (0.5-2.5 MPa) and at a temperature of about 180-320° C. (215-300° C.). The polycondensation is generally continued in the melt at atmospheric or reduced pressure so as to achieve the desired degree of progress.

The polycondensation product is a molten polymer or prepolymer. At this stage, the reaction medium may comprise a vapour phase consisting essentially of vapour of the elimination product, in particular water, which may have been formed and/or vaporized.

This product may be subjected to steps for separating out the vapour phase and for finishing in order to achieve the desired degree of polycondensation. The separation of the vapour phase may be performed, for example, in a device of cyclone type for a continuous process. Such devices are known.

The finishing consists in maintaining the polycondensation product in molten form, at a pressure in the region of atmospheric pressure or at a reduced pressure, for a time that is sufficient to achieve the desired degree of progress. Such an operation is known to those skilled in the art. The temperature of the finishing step is advantageously greater than or equal to 200° C. and in all cases greater than the solidification temperature of the polymer. The residence time in the finishing device is preferably greater than or equal to 5 minutes.

In the case of processes that are more suited to the polymerization of the polyamide MXD6, the two monomers are introduced into the reactor without proceeding via a salification phase: this is then referred to as the direct amidation process. The reaction in this case is generally performed at atmospheric pressure.

The polycondensation product may also undergo a postcondensation step in solid or liquid phase. This step is known to those skilled in the art and makes it possible to increase the degree of polycondensation to a desired value.

The polyamide obtained via the process of the invention in molten form may thus be formed directly or may be extruded and granulated, for an optional post-condensation step and/or for subsequent forming after melting.

A second process for preparing the polyamide according to the invention is a "diester aminolysis" process, i.e. at least one diamine of formula V as described previously is reacted with at least one methyl, ethyl, propyl or butyl diester (formula IV') of the carboxylic acid of formula IV as described previously. A similar process applied to different monomers is moreover described in the publication from Ulrich Fehrenbacher in Chemie Ingenieur Technik (Polymere) 2009, 81, 11, 1829-1835. According to one preferred embodiment of the invention, at least one diamine of formula V is biosourced according to standard ASTM D6866. According to one preferred embodiment of the invention, at least one diester of formula IV' is biosourced according to standard ASTM D6866.

Finally, the present invention also envisages another process for preparing the polyamide according to the invention, the said process comprising the reaction between at least one diamine of formula V as described previously and at least one dinitrile of formula IV" below: NC-A-CN (IV") with A corresponding to the same definition as that given above in the description. A similar process applied to different monomers is moreover described in WO 2001/079 327. According to one preferred embodiment of the invention, at least one diamine of formula V is biosourced according to standard ASTM D6866. According to one preferred embodiment of the invention, at least one dinitrile of formula IV" is biosourced according to standard ASTM D6866.

The polyamide may be used to prepare articles by moulding, injection-moulding, injection/blow-moulding, extrusion/blow-moulding, extrusion or spinning. The articles may thus take the form of moulded or extruded pieces, films, yarns, fibres or filaments.

The articles thus obtained have applications in numerous fields such as technical plastics (motor vehicle, E&E, consumer goods), industrial yarns, the textile industry, packaging, etc.

The present invention also relates to compositions comprising at least the polyamide of the invention, and optionally reinforcing fillers and/or various additives.

Such a composition preferentially comprises from 1% to 80% by weight of the polyamide according to the invention, relative to the total weight of the composition. This composition may especially comprise other types of polymer, especially such as thermoplastic polymers.

The composition may also comprise reinforcing or bulking fillers. Reinforcing or bulking fillers are fillers conventionally used for making polyamide compositions. Mention may be made especially of reinforcing fibrous fillers, such as glass fibres, carbon fibres or organic fibres, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, for instance dimethacrylate particles, glass beads or glass powder.

The composition according to the invention may comprise between 5% and 60% by weight of reinforcing or bulking fillers and preferentially between 10% and 40% by weight, relative to the total weight of the composition.

The composition according to the invention comprising the polyamide as defined previously may comprise at least one impact modifier, i.e. a compound that is capable of modifying the impact strength of a polyamide composition. These impact modifier compounds preferentially comprise functional groups that are reactive with the polyamide. According to the invention, the term "functional groups that are reactive with the polyamide" means groups that are capable of reacting or of interacting chemically with the acid or amine functions of the polyamide, especially by covalency, ionic or hydrogen interaction or van der Waals bonding. Such reactive groups ensure good dispersion of the impact modifiers in the polyamide matrix. Good dispersion is generally obtained with impact modifiers that have a mean size of between 0.1 and 2 pm in the matrix.

The composition according to the invention may also comprise additives usually used for the manufacture of polyamide compositions. Thus, mention may be made of lubricants, flame retardants, light and/or heat stabilizers, plasticizers, nucleating agents, UV stabilizers, catalysts, antioxidants, antistatic agents, dyes, matting agents, moulding additives or other conventional additives.

These fillers and additives may be added to the modified polyamide via usual means suited to each filler or additive, for instance during the polymerization or mixed in the melt. The polyamide compositions are generally obtained by mixing the various compounds included in the composition without heat or in the melt. The process is performed at more or less high temperature, at more or less high shear depending on the nature of the various compounds. The compounds may be introduced simultaneously or successively. An extrusion device in which the material is heated, and then melted and subjected to a shear force, and conveyed, is generally used.

It is possible to mix all the compounds in the molten phase in a single operation, for example during an extrusion operation. It is possible, for example, to perform a mixing of granules of the polymer materials, to introduce them into the extrusion device in order to melt them and to subject them to a more or less high shear. According to particular embodiments, premixing, optionally in the melt, of some of the compounds may be performed before preparation of the final composition.

The composition according to the invention, when it is prepared using an extrusion device, is preferably conditioned in the form of granules. The granules are intended to be formed using processes involving melting to obtain articles. The articles are thus constituted by the composition. According to one common embodiment, the modified polyamide is extruded in the form of rods, for example in a twin-screw extrusion device, which are then chopped into granules. The pieces are then made by melting the granules produced above and feeding the composition in melt form into forming devices, for example injection-moulding devices.

The composition according to the invention allows the preparation of articles obtained by forming the said composition, for example by extrusion, especially extrusion of plates, sheets or films, moulding, especially injection-moulding, rotary moulding, blow-moulding, especially injection/blow-moulding, or spinning. Articles that may be mentioned include those used in the motor vehicle or electronics and electrical industry, for example.

The articles obtained may especially be moulded, blown or extruded pieces, yarns, fibres, filaments or films.

The polyamide according to the invention has many advantages. First, it is advantageously at least partly biosourced, which makes it possible to reduce its environmental footprint. It also has very advantageous mechanical properties, a high molar mass and, depending on the dicarboxylic acid used, it may be semi-crystalline. The polyamide of the invention may, finally, replace the polyamides conventionally used in fields such as technical plastics (motor vehicle, E&E, consumer goods), industrial yarns, the textile industry, packaging, etc.

The process of the invention also has many advantages. In particular, when it is a process of "salt" type it is very easy to control the stoichiometry between the dicarboxylic acid and the diamine. Furthermore, the process does not generate any degradation products such as furan, which is a highly toxic product. In addition, the preparation of the polyamide according to the invention may be performed using industrial equipment usually used in factories for manufacturing polyamides of the type obtained from dicarboxylic acids and diamines, especially polyamide 66, and therefore does not require any additional industrial investment.

Other details or advantages of the invention will emerge more clearly in the light of the examples given below.

EXAMPLES

Measuring Methods:

The melting point (Tf) and cooling crystallization point (Tc) of the polyamides prepared below are determined by differential scanning calorimetry (DSC), using a Perkin Elmer Pyris 1 machine, at a rate of 10° C./min. The Tf and Tc of the polyamides are determined at the top of the melting and crystallization peaks. The glass transition temperature (Tg), when it is measurable, is also determined at 10° C./min. The measurements are performed after melting the polyamide formed at a temperature T>(Tf of the polyamide+20° C.).

Preparation of a Polyamide From 2,5-furandicarboxylic Acid (FDCA) and Hexamethylenediamine:

A salt of 2,5-furandicarboxylic acid (FDCA) and of hexamethylenediamine is prepared by adding 2 g of FDCA (0.0128 mol) to 4.59 g of aqueous 32.5% hexamethylenediamine solution (0.0128 mol). Exothermicity is produced during the salification, and the reaction medium is then maintained at 50° C. for 2 hours and becomes perfectly clear. The dry salt is recovered and then analysed by thermogravimetric analysis coupled to an infrared detector: this involves heating the salt at 10° C./min. A substantial evolution of $CO_2$ and of furan is detected at and above 245° C., i.e. during the melting of the salt 6FDCA, which is a sign of degradation of the 2,5-furandicarboxylic acid units. It is therefore not possible to prepare polyamides of high molecular mass via this route. In addition, the oligomers obtained are amorphous and have a glass transition temperature Tg of 110° C., which presents no applicative interest.

Examples According to the Invention: Preparation of Polyamides From 2,5-bis(aminomethyl)furan and Dicarboxylic Acids:

2,5-Bis(aminomethyl)furan is synthesized in the following manner in 4 steps:

a. The starting molecule is 5-(hydroxymethyl)furfural (225.0 g, 1.8 mol), which is introduced into 1.5 L of ethanol and $NaBH_4$ (90.0 g, 1.8 mol) is then introduced. The reaction mixture is stirred for 16 hours at 20° C. Aqueous 10% HCl solution is added slowly to obtain pH 7. The solvent is then evaporated off by distillation at 40° C. under vacuum to give a white solid, which is recrystallized from ethanol: production of 215 g of a yellow solid (furan-2,5-dimethanol) in a purity equal to 99% (determined by LCMS). Reaction yield: 96%.

b. The furan-2,5-dimethanol obtained (215.0 g, 1.68 mol) is dissolved in pyridine (346.5 g, 4.368 mol). The solution is added dropwise over a period of one hour to a solution of thionyl chloride (579.7 g, 4.872 mol) in 1 L of ethyl acetate at a temperature of between −20° C. and 0° C. The reaction mixture is warmed to room temperature and 3 L of petroleum ether are added, followed by 2 L of ice-cold water. The organic phase is washed with aqueous 10% $K_2CO_3$ solution and then dried. The solvent is removed under reduced pressure to give 162.0 g of a brownish oil (2,5-bis(chloromethyl) furan) in a purity equal to 98% (determined by LCMS). Reaction yield: 60%. The product decomposes rapidly, and is therefore used immediately for the following step.

c. A solution of 2,5-bis(chloromethyl)furan (162.0 g, 981.4 mmol) and of NaN$_3$ (192.0 g, 2.955 mol) in 1.5 L of DMSA is stirred at 50° C. for 16 hours. The reaction medium is added to 1.5 L of ice-cold water and then extracted 3 times with 800 mL of petroleum ether. The organic phase is dried and concentrated under vacuum to give 157.5 g of a brown oil (2,5-bis(azidomethyl)furan) in a purity equal to 99% (determined by LCMS). Reaction yield: 90%.

d. A solution of 2,5-bis(azidomethyl)furan (157.5 g, 885.0 mmol) and of Raney nickel (68.0 g) in 1.5 L of methanol is stirred at 1 atm of H$_2$ at room temperature. After 40 hours, the reaction is complete and the reaction medium is filtered. The filtrate is concentrated to finally give 94.5 g of a brown oil (2,5-bis(aminomethyl)furan) in a purity of 99% determined by LCMS. Reaction yield: 85%.

A salt of adipic acid and of 2,5-bis(aminomethyl)furan (monomer noted F) is prepared by dissolving at room temperature the monomers in stoichiometric amount (2 g of F (0.0159 mol) and 2.3 g of adipic acid) at 20% in water. The reaction medium is heated at 80° C. for 2 hours. This is the salt named F6.

A salt of sebacic acid and of 2,5-bis(aminomethyl)furan is prepared by dissolving at room temperature the monomers in stoichiometric amount (2 g of F (0.0159 mol) and 3.2 g of sebacic acid) at 20% in water. The reaction medium is heated at 80° C. for 2 hours. This is the salt named F10.

A salt of terephthalic acid and of 2,5-bis(aminomethyl)furan is prepared by dissolving at room temperature the monomers in stoichiometric amount (2 g of F (0.0159 mol) and 2.6 g of terephthalic acid) at 20% in water. The reaction medium is heated at 80° C. for 2 hours. This is the salt named FT.

A salt of isophthalic acid and of 2,5-bis(aminomethyl)furan is prepared by dissolving at room temperature the monomers in stoichiometric amount (2 g of F (0.0159 mol) and 2.3 g of isophthalic acid) at 20% in water. The reaction medium is heated at 80° C. for 2 hours. This is the salt named FI.

Each salt is heated above its melting point and the amidation reaction takes place. The polyamides obtained have satisfactory thermal characteristics.

In the case of the salt of sebacic acid and of 2,5-bis(aminomethyl)furan, the polyamide PA F10 is obtained by heating the dry salt at 200° C. under a stream of nitrogen for 3 hours. The amidation reaction is monitored by the evolution of reaction water. The polyamide obtained has a melting range of between 170° C. and 220° C. with a peak melting point of 213° C. Crystallization on cooling begins at 175° C. and ends at 120° C. with a peak crystallization temperature of 144° C. The polyamide is partially soluble in sulphuric acid and in trifluoroacetic acid.

Examples According to the Invention: Preparation of Polyamides From 2,5-bis(aminomethyl)tetrahydrofuran and From Dicarboxylic Acids:

2,5-Bis(aminomethyl)tetrahydrofuran (monomer noted TF) is synthesized in the following manner in three steps.

The starting molecule is tetrahydrofuran-2,5-dimethanol, synthesized from the reaction in methanol of 5-(hydroxymethyl)furfural (HMF) with Raney nickel (1.5 equivalents relative to the HMF) at a pressure of 5.84 bar of H$_2$ at 60° C. for 20 hours, filtration and purification by distillation. A slightly yellow liquid is obtained in a purity of greater than 98% (determined by chromatography/coupled mass spectroscopy). Reaction yield: 95%.

Methanesulphonyl chloride (307.8 g, 2.7 mol) is added dropwise to a solution of tetrahydrofuran-2,5-dimethanol (118.8 g, 900 mmol) and of triethylamine (454.5 g, 4500 mmol) in 1.54 L of dichloromethane at 0° C. The reaction medium is maintained at 0° C. for 1 hour, ice-cold water is then added and the organic phase is separated out and washed with 500 mL of dilute (1 M) hydrochloric acid solution. The organic phase is separated out and then washed with 500 mL of saturated aqueous NaHCO$_3$ solution. The organic phase is finally separated out and concentrated to give 236.7 g of (tetrahydrofuran-2,5-diyl)bis(methylene) dimethanesulphonate in the form of a brown oil in a purity equal to 96% (determined by LCMS). Reaction yield: 91.0%. A solution of (tetrahydrofuran-2,5-diyl)bis(methylene) dimethanesulphonate (236.7 g, 821.7 mmol) and NaN$_3$ (270.0 g, 4.1094 mol) in DMSO (1.350 L) is heated at 95° C. and stirred overnight. The reaction medium is added to ice-cold water and extracted with 3 times 700 mL of ethyl acetate. The extracts (phase containing ethyl acetate) are successively washed with water, saturated aqueous NaHCO$_3$ solution and dried overnight on MgSO$_4$ and then filtered to remove the MgSO$_4$. The phase containing the ethyl acetate is concentrated to give 166.5 g of 2,5-bis(azidomethyl)tetrahydrofuran in the form of a brown oil. A mixture of 2,5-bis(azidomethyl)tetrahydrofuran (166.5 g) and Pd-C (10%, 10.8 g) in methanol (2.7 L) is stirred overnight at room temperature under 1 atm of H$_2$. The reaction medium is filtered and the filtrate is concentrated under vacuum to give 90.0 g of 2,5-bis(aminomethyl)tetrahydrofuran in the form of a yellow oil. The total yield for the 3 successive reactions is 75%. The process for synthesizing 2,5-bis(aminomethyl)tetrahydrofuran gives a 90/10 mixture of the cis/trans isomers according to $^{13}$C NMR analysis in deuterated methanol.

A salt of sebacic acid and of 2,5-bis(aminomethyl)tetrahydrofuran, named salt TF10, and a salt of adipic acid and of 2,5-bis(aminomethyl)tetrahydrofuran, named salt TF6, are prepared by mixing stoichiometric amounts of diacid and of diamine in methanol. The salts TF6 and TF10 are obtained in their dry form by evaporating off the methanol under vacuum at 40° C. overnight.

The dry salts TF6 and TF10 are each heated to 200° C. under a stream of nitrogen for 3 hours to obtain, respectively, the polyamides PA TF6 and PA TF10. The amidation reaction is monitored by the evolution of reaction water. The two polyamides PA TF6 and PA TF10 are totally soluble in sulphuric acid and in trifluoroacetic acid. The analysis of their thermal properties shows that:

For PA TF6: the polyamide does not crystallize during cooling at 10° C./min, but crystallizes during a temperature increase at 10° C./min. The crystallization begins at 110° C. and ends at 170° C., with a peak crystallization temperature of 150° C. The melting range is between 170° C. and 205° C. with a peak melting point of 197° C. The glass transition temperature measured is 55° C.

For PA TF10: the polyamide has two distinct melting points, the peak melting point values of which are equal to 171° C. and 192° C. The crystallization on cooling ranges between 140° C. and 80° C., with a peak melting point of 113° C.

The polyamides obtained from 2,5-bis(aminomethyl)tetrahydrofuran and from 2,5-bis(aminomethyl)furan are thus indeed semi-crystalline and may be readily synthesized via a polymerization route starting with salt, that enables perfect control of the stoichiometry of the reagents. They may thus be used in the applications of the known semi-crystalline polyamides.

The invention claimed is:

1. A polyamide comprising the repeating unit of formula I below:

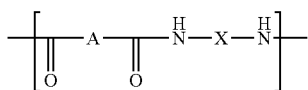  (I)

in which
A represents a covalent bond or a divalent hydrocarbon-based group selected from the group consisting of linear saturated and unsaturated aliphatics, saturated and unsaturated cycloaliphatics, 1,4-benzene and 2,6-naphthalene, —$(CH_2)_n$—Ph-$(CH_2)_{n'}$— with n and n' being integers, and alkylaromatics;
X represents a divalent group of formula II or III below:

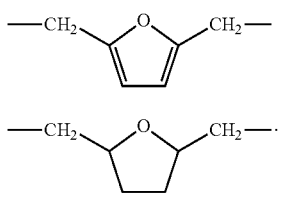

2. The polyamide according to claim 1, in which A is a linear alkyl group containing from 1 to 36 carbon atoms.

3. The polyamide according to claim 1, in which A is selected from the group consisting of —$(CH_2)_4$—, —$(CH_2)_8$— and —$(CH_2)_{10}$—.

4. The polyamide according to claim 1, in which X is the divalent group of formula II.

5. The polyamide according to claim 1, in which X is the divalent group of formula III.

6. The polyamide according to claim 5, in which X is the trans stereoisomer.

7. The polyamide according to claim 1, wherein the polyamide is a homopolyamide consisting entirely of the repeating unit of formula I.

8. The polyamide according to claim 1, wherein the polyamide is a copolymer comprising other repeating units different from the unit of formula I, said repeating units different from the unit of formula I originating from comonomers, dicarboxylic acids, diamines, amino acids and/or lactams.

9. A process for preparing a polyamide according to claim 1, the process comprising a polycondensation reaction between:
at least one dicarboxylic acid or at least one carboxylic acid diester or at least one dinitrile of respective formulae IV, IV' and IV" below:

HOOC-A-COOH        (IV)

ROOC-A-COOR        (IV'), with R being a C1-C4 alkyl;

NC-A-CN        (IV")

in which
A represents a covalent bond or a divalent hydrocarbon-based group selected from the group consisting of linear saturated and unsaturated aliphatics, saturated and unsaturated cycloaliphatics, 1,4-benzene and 2,6-naphthalene, —$(CH_2)_n$—Ph-$(CH_2)_{n'}$— with n and n' being integers, and alkylaromatics; and
at least one diamine of formula V below:

$H_2N$—X—$NH_2$        (V)

in which X represents a divalent group of formula II or III below:

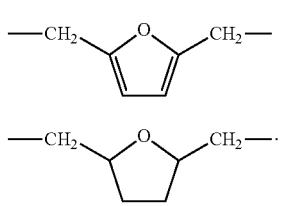

10. The process according to claim 9, wherein the at least one diamine of formula V is biosourced according to standard ASTM D6866.

11. The process according to claim 9, wherein the process comprises a polycondensation reaction between:
at least one dicarboxylic acid of formula IV below:

HOOC-A-COOH        (IV);

and
at least one diamine of formula V below:

$H_2N$—X—$NH_2$        (V).

12. The process according to claim 9, wherein the at least one dicarboxylic acid of formula IV is biosourced according to standard ASTM D6866.

13. A process for making articles comprising the polyamide according to claim 1, the process comprising moulding, injection-moulding, injection/blow-moulding, extrusion/blow-moulding, extrusion or spinning.

14. An article obtained from the polyamide according to claim 1, the said article being moulded or extruded pieces, yarns, fibres, filaments or films.

15. A composition comprising the polyamide according to claim 1, and optionally further comprising reinforcing fillers and/or additives.

16. The polyamide according to claim 2, in which A is a linear alkyl group containing from 4 to 10 carbon atoms.

17. The polyamide according to claim 1, in which A is the group 1,4-benzene.

* * * * *